(12) United States Patent  (10) Patent No.: US 7,044,554 B2
Furtado et al.              (45) Date of Patent:     May 16, 2006

(54) VEHICLE SEAT HAVING A HEAD RESTRAINT INDEPENDENT FROM ITS BACKREST

(75) Inventors: Roland Furtado, Northville, MI (US); Mari C. Milosic, Grosse Pointe, MI (US); Steven James Reed, Pinckney, MI (US)

(73) Assignee: Intier Automotive Inc., Aurora (CA)

( * ) Notice: Subject to any disclaimer, the term of this patent is extended or adjusted under 35 U.S.C. 154(b) by 0 days.

(21) Appl. No.: 10/501,942

(22) PCT Filed: Jan. 29, 2003

(86) PCT No.: PCT/US03/02582

§ 371 (c)(1),
(2), (4) Date: Apr. 20, 2005

(87) PCT Pub. No.: WO03/064206

PCT Pub. Date: Aug. 7, 2003

(65) Prior Publication Data

US 2005/0225145 A1    Oct. 13, 2005

Related U.S. Application Data

(60) Provisional application No. 60/352,918, filed on Jan. 29, 2002.

(51) Int. Cl.
*B60N 2/02* (2006.01)
(52) U.S. Cl. ........................................ 297/376; 297/408
(58) Field of Classification Search ............... 297/376, 297/367, 410, 408, 378.1, 378.12
See application file for complete search history.

(56) References Cited

U.S. PATENT DOCUMENTS

| | | | |
|---|---|---|---|
| 2,649,142 A | | 8/1953 | New |
| 3,310,342 A | | 3/1967 | Drelichowski |
| 4,123,104 A | | 10/1978 | Andres et al. |
| 4,128,274 A | | 12/1978 | Schmedemann |
| 4,249,754 A | | 2/1981 | Best |
| 4,623,166 A | | 11/1986 | Andres et al. |
| 4,830,434 A | * | 5/1989 | Ishida et al. ............... 297/408 |
| 5,346,282 A | | 9/1994 | De Filippo |
| 5,669,666 A | * | 9/1997 | Lee ........................... 297/408 |
| 5,927,803 A | | 7/1999 | Hehl et al. |
| 5,975,637 A | * | 11/1999 | Geuss et al. ............... 297/391 |
| 6,033,017 A | | 3/2000 | Elqadah et al. |
| 6,074,008 A | * | 6/2000 | Gorgi et al. ............... 297/376 |
| 6,135,561 A | | 10/2000 | Krueger |
| 6,179,379 B1 | | 1/2001 | Andersson |
| 6,368,261 B1 | * | 4/2002 | Doehler ..................... 482/142 |
| 6,634,714 B1 | * | 10/2003 | Pejathaya ............... 297/378.12 |

FOREIGN PATENT DOCUMENTS

| | | |
|---|---|---|
| EP | 1 053 907 | 11/2000 |
| FR | 59 666 | 6/1954 |
| JP | 63 305045 | 12/1988 |

\* cited by examiner

*Primary Examiner*—Milton Nelson, Jr.
(74) *Attorney, Agent, or Firm*—Clark Hill PLC

(57) ABSTRACT

A seat assembly for supporting an occupant in an automotive vehicle. The seat assembly includes a seat cushion and a seat back. The seat back is operatively coupled to the seat cushion for pivotal movement of the seat back about a first pivot axis relative to the seat cushion. A head restraint support assembly is operatively coupled to the seat cushion for pivotal movement with the seat back about the first pivot axis and independent pivotal movement relative to the seat back about a second pivot axis.

18 Claims, 3 Drawing Sheets

VEHICLE SEAT HAVING A HEAD RESTRAINT INDEPENDENT FROM ITS BACKREST

This application claims the benefit of provisional application No. 60/352,918 filled Jan. 29, 2002.

BACKGROUND OF THE INVENTION

1. Field of the Invention

The invention relates to a seat assembly for an automotive vehicle, and more particularly, to an independent head restraint support assembly for supporting the head of an occupant of the seat assembly.

2. Description of the Prior Art

Automotive vehicles include seat assemblies for supporting occupants within the vehicle. A seat assembly typically includes a seat cushion, a seat back pivotally assembled to the seat cushion by a hinge device, and a head restraint mounted to the top of the seat back. Typically, the distance between the head restraint and the top of the seat back is adjustable to accommodate a range of occupant heights. Also, head restraints are often pivotally adjustable relative to the seat back to allow the occupant to increase or decrease the distance between the head restraint and the occupant's head. However, conventional seat designs allow for only a limited range of height and pivotal adjustment of the head restraint relative to the seat back.

Therefore, it remains desirable to have a vehicle seat having a head restraint supported independently relative to the seat back allowing for a greater range of height and pivotal adjustment of the head restraint over conventional seat designs.

SUMMARY OF THE INVENTION

According to one aspect of the invention, a seat assembly is provided for supporting an occupant in an automotive vehicle. The seat assembly includes a seat cushion and a seat back. The seat back is operatively coupled to the seat cushion for pivotal movement of the seat back about a first pivot axis relative to the seat cushion. A head restraint support assembly is operatively coupled to the seat cushion for pivotal movement with the seat back about the first pivot axis and independent pivotal movement relative to the seat back about a second pivot axis.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE INVENTION

Figure 1:
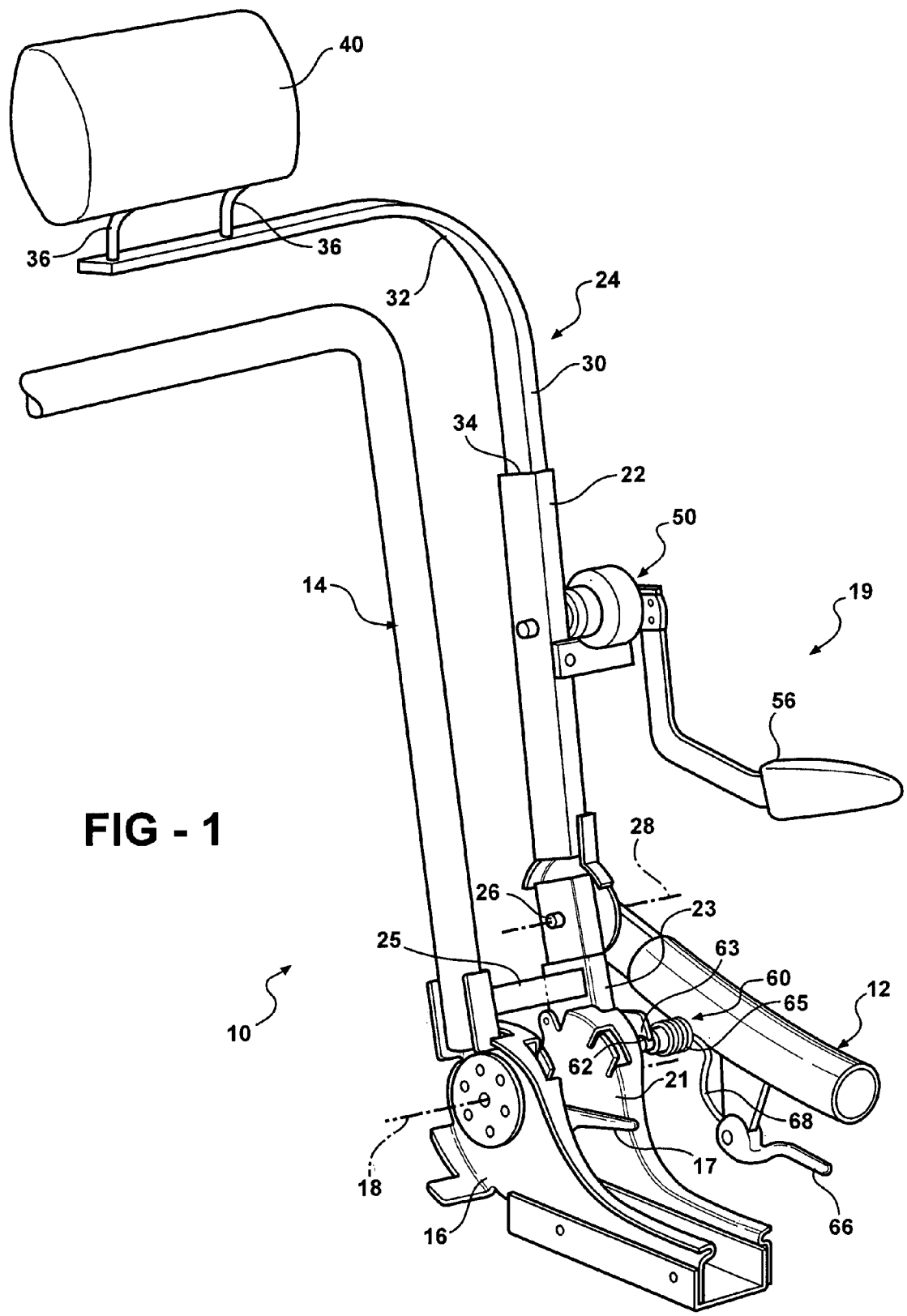
FIG. 1 is a perspective view of a seat assembly incorporating an independent head restraint according to the invention.
Figure 2:
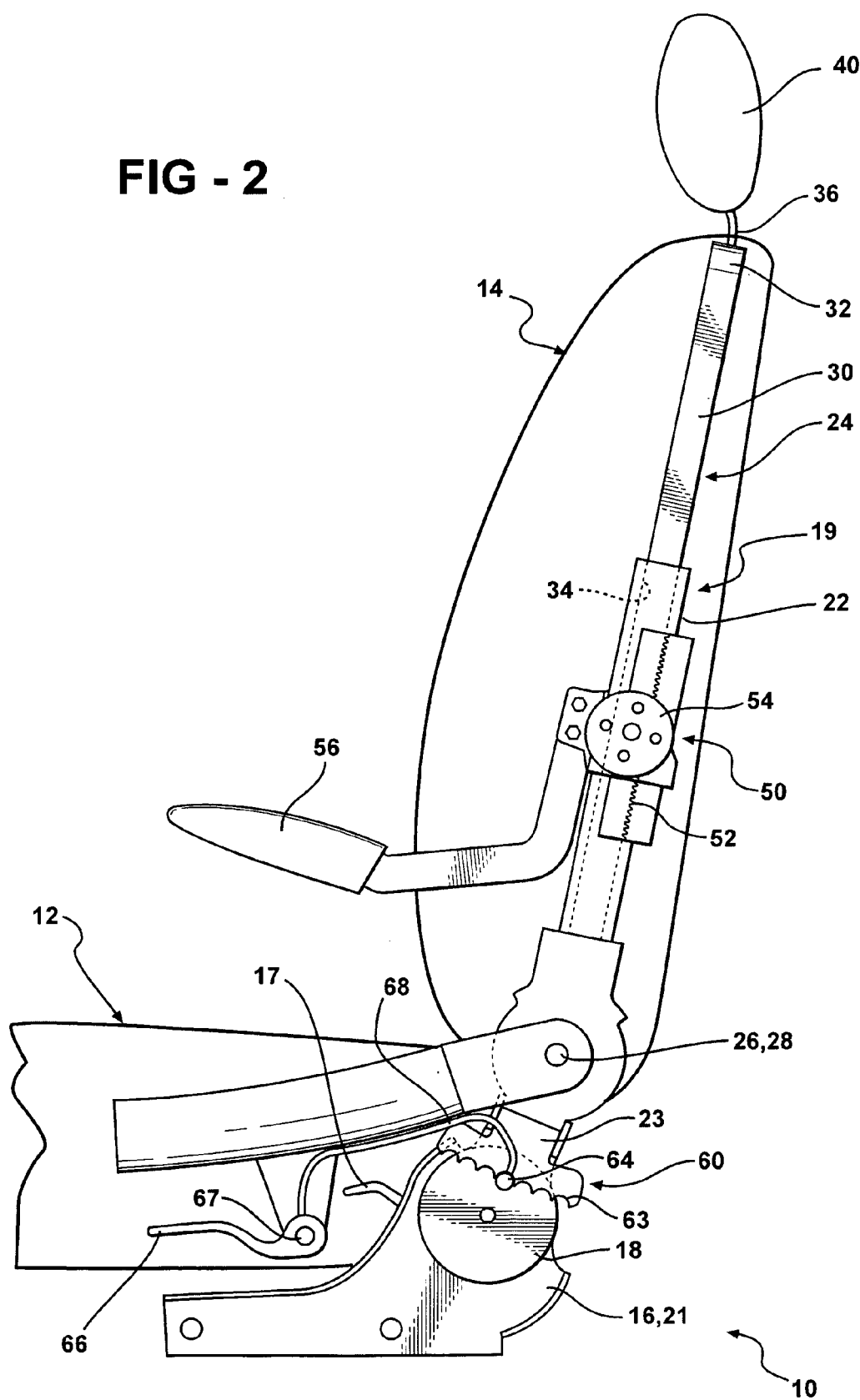
FIG. 2 is a side view of the seat assembly.

Referring to the figures, a seat assembly for supporting an occupant in an automotive vehicle is generally indicated at 10 in FIGS. 1 and 2. The seat assembly 10 includes a seat cushion 12 and a seat back 14. The seat back 14 is pivotally assembled to the seat cushion 12 by a first hinge or recliner 16. The first recliner 16 allows for pivotal adjustment of the seat back 14 relative to the seat cushion 12 about a first pivot axis 18. The first recliner 16 is moveable between locked and unlocked positions for selectively locking the seat back 14 in any one of a plurality of reclined seating positions. A release lever 17 extends from the first recliner 16 for actuating the recliner 16 between the locked and unlocked positions. An example of such a recliner is shown in PCT application CA 99/00653, published Feb. 10, 2000, which is incorporated herein by reference in its entirety.

The seat assembly 10 includes a head restraint support assembly 19 having a having a fixed member 22 and a mobile member 24. The mobile member 24 is slidably coupled to the fixed member 22 for adjustment among a plurality of vertical positions relative to fixed member 22. A second hinge or recliner 21 interconnects the fixed member 22 and the seat cushion 12 for pivotal adjustment of the head restraint support assembly 19 about the first pivot axis 18. The first 16 and second 21 recliners are interconnected by a cable (not shown) for synchronizing movement of the first 16 and second 21 recliner between the locked and unlocked positions by articulation of the release lever 17. A recliner bracket 23 extends radially from the second recliner 21. A cross member 25 interconnects the recliner bracket 23 to the seat back 14 allowing the head restraint support assembly 19 to pivot with the seat back 14 about the first pivot axis 18. The fixed member 22 is pivotally assembled by a pivot pin 26 to the recliner bracket 23 allowing pivotal movement of the head restraint support assembly 19 about a second pivot axis 28 between a plurality of reclined support positions relative to the seat back 14. The mobile member 24 includes a first arm 30 generally aligned with the seat back 14 and a second arm 32 cantilevered horizontally therefrom above the seat back 14. The fixed member 22 includes a channel 34 for slidably receiving the first arm 30 of the mobile member 24 allowing generally linear displacement of the mobile member 24 relative to the fixed member 22 among a plurality of vertical positions.

A pair of head restraint guide posts 36 extends from the second arm 32. A head restraint 40 is slidably mounted to the guide posts 36 allowing for height adjustment of the head restraint 40 relative to the mobile member 24 to accommodate occupants of various heights. The height of the head restraint 40 relative to the seat back 14 may be further adjusted by sliding the mobile member 24 upwardly or downwardly relative to the fixed member 22.

A latch mechanism 50 is operatively coupled between the fixed 22 and mobile 24 members for selectively locking the mobile member relative to the fixed member in any one of the plurality of vertical positions. More specifically, the latch mechanism 50 includes a rack of teeth 52 aligned longitudinally and fixedly secured to the mobile member 24 by any suitable means, such as welding or bolting. Alternatively, the teeth 52 may be integrally formed in mobile member 24. The rack of teeth 52 generally define the plurality of vertical positions. A pawl 54 adapted for lockingly engaging the teeth 52 is movably assembled to the fixed member 22 for movement between locked and unlocked positions with respect to the teeth 52. In the locked position, the pawl 54 is engaged with the teeth 52 to maintain the mobile member 24 in one of the plurality of vertical positions relative to the fixed member 22. In the unlocked position, the pawl 54 is disengaged with the teeth 52 to allow sliding movement of the mobile member 24 relative to the fixed member 22 among the plurality of vertical positions. A biasing member (not shown) of any suitable type, such as a helical spring, continuously biases the pawl 54 toward the locked position. A release handle 56 is pivotally assembled to the fixed member 22 and adapted for actuating the pawl 54 between the locked and unlocked positions in response to corresponding pivotal movement of the release handle 56 relative to the fixed member 22. Thus, an occupant may adjust the height of the head restraint 40 relative to the seat back 14 by sliding the head restraint 40 on the guide posts 36 or by actuating the pawl 54 to the unlocked position with the release handle 56 and displacing the mobile member 24 relative to the fixed member 22. Alternatively, a continuously engaged ratchet mechanism (not shown) may be mounted in place of the latch mechanism 50 to the fixed member 22 allowing ratcheting adjustment of the mobile member 24 relative to the fixed member 22.

Figure 3:
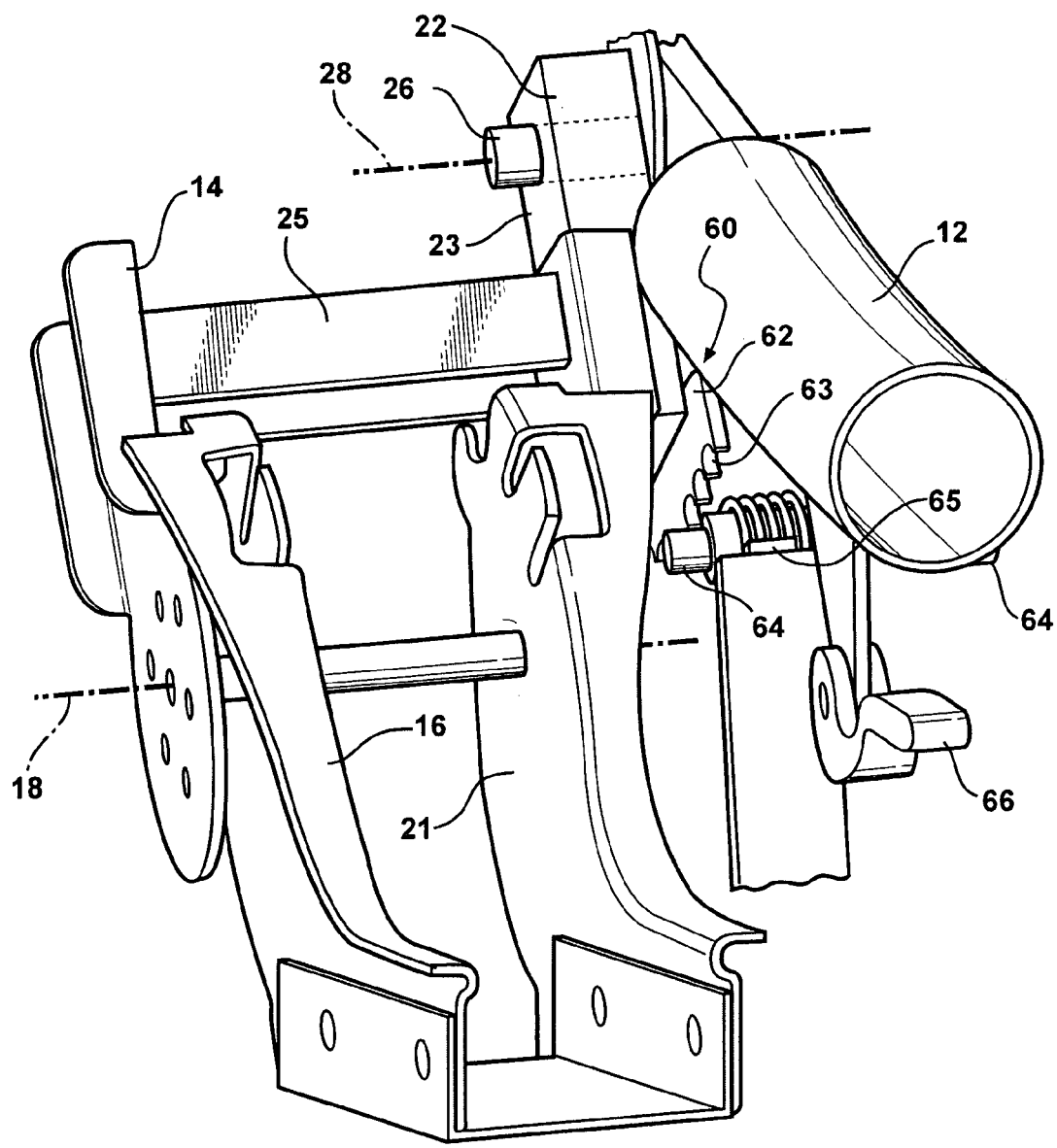
FIG. 3 is an enlarged perspective view of hinges in the seat assembly.

Referring to FIGS. 1 through 3, the head restraint support assembly 19 further includes a latch mechanism 60 for selectively locking the head restraint support assembly 19 in any one of the plurality of reclined support positions about the second pivot axis 28. More specifically, the latch mechanism 60 includes a sector of teeth 62 centered about the second pivot axis 28 and secured to the fixed member 22. Adjacent teeth 62 are spaced apart defining a gap 63 therebetween. Each gap 63 defines each of the reclined support positions of the head restraint support frame 20. A pin 64 adapted for engaging each of the gaps 63 between the teeth 62 is operatively assembled to the seat cushion 12 for axial movement between locked and unlocked positions. In the locked position, the pin 64 extends axially through any one of the gaps 63 to maintain the head restraint support frame 20 in the corresponding recline support position about the second pivot axis 28. In the unlocked position, the pin 64 is retracted from the gaps 63 allowing the head restraint support frame 20 to pivot freely about the second pivot axis 28 independent from the seat back 14. A biasing member 65 of any suitable type, such as a helical spring, is energized between the seat cushion 14 and the pin 64 for biasing the pin 64 in the locked position. A lever 66 is pivotally mounted to the seat cushion 14 by a pivot pin 67. A cable 68, preferably a bowden-type cable, interconnects the lever 66 and the pin 64 so that the pin 64 moves between the unlocked and locked positions in response to corresponding pivotal movement of the lever 66. Thus, an occupant may adjust the angular position of the head restraint 40 about the second pivot axis 28 by actuating the lever 66 to retract the pin 64 axially from one of the gaps 63. Once the head restraint support frame 20 is adjusted to one of the plurality of recline support position, the occupant releases the lever 66 to allow the pin 64 to return to the locked position under the force applied by the biasing member 65.

The occupant may adjust the angular position of the seat back 14 and the head restraint support assembly 19 about the first pivot axis 18 by actuating the first 16 and second 21 recliners to the unlocked position with the release lever 17. In the locked position, the first 16 and second 21 recliners maintain the angular position of the seat back 14 and the head restraint support assembly 19, respectively, about the first pivot axis 18. In the unlocked position, both the seat back 14 and the head restraint support assembly 19 are freely moveable about the first pivot axis 18.

The invention has been described in an illustrative manner, and it is to be understood that the terminology, which has been used, is intended to be in the nature of words of description rather than of limitation.

Many modification and variations of the present invention are possible in light of the above teachings. It is, therefore, to be understood that within the scope of the appended claims, the invention may be practiced other than as specifically described.

What is claimed is:

1. A seat assembly for supporting an occupant in an automotive vehicle, said seat assembly comprising:
    a seat cushion;
    a seat back operatively assembled to said seat cushion for pivotal movement of said seat back about a first pivot axis relative to said seat cushion;
    a head restraint support assembly operatively coupled to said seat cushion for pivotal movement with said seat back about said first pivot axis and independent pivotal movement relative to said seat back about a second pivot axis;
    a first hinge interconnecting said seat back and said seat cushion for selective pivotal adjustment of said seat back relative to said seat cushion about said first axis among a plurality of reclined positions; and
    a second hinge interconnecting said head restraint support assembly and said seat cushion for providing selective pivotal adjustment of said head restraint support assembly relative to said seat cushion about said first axis among said plurality of reclined positions.

2. A seat assembly as set forth in claim 1 including a head restraint supported by said head restraint support assembly for selective pivotal movement together with said head restraint support assembly about said first and second pivot axes.

3. A seat assembly as set forth in claim 2 wherein said head restraint support assembly includes a fixed member coupled between said second hinge and said head restraint for selective pivotal adjustment of said head restraint relative to said seat cushion about said first axis among said plurality of reclined positions.

4. A seat assembly as set forth in claim 3 wherein said head restraint support assembly includes a mobile member having an arm cantilevered laterally above said seat back for carrying said head restraint and slidably coupled to said fixed member for selective height adjustment of said head restraint relative to said seat back among a plurality of vertical positions.

5. A seat assembly as set forth in claim 4 wherein said head restraint support assembly includes a recliner bracket coupled between said second hinge and said fixed member for selective pivotal adjustment of said head restraint relative to said seat cushion about said first axis among said plurality of reclined positions.

6. A seat assembly as set forth in claim 5 including a cross member extending between said recliner bracket and said seat back, whereby said head restraint support assembly pivots together with said seat back about said first pivot axis.

7. A seat assembly as set forth in claim 6 wherein said fixed member is pivotally coupled to said recliner bracket for independent pivotal adjustment of said head restraint about said second axis with respect to said seat back among a plurality of reclined support positions.

8. A seat assembly as set forth in claim 7 including a locking mechanism operatively coupled between said fixed member and said recliner bracket for selectively locking said head restraint in one of said plurality of reclined support positions.

9. A seat assembly as set forth in claim 8 wherein said locking mechanism includes a sector of teeth extending radially from said fixed member and centered about said second axis, wherein said sector of teeth defines said plurality of reclined support positions.

10. A seat assembly as set forth in claim 9 wherein said locking mechanism includes a pin operatively supported by said seat cushion for movement between a locked position, wherein said pin is lockingly engaged with said sector of teeth to maintain said head restraint in one of said plurality of reclined support positions, and an unlocked position, wherein said pin is disengaged from said sector of teeth to allow pivotal adjustment of said head restraint about said second axis among said plurality of reclined support positions.

11. A seat assembly as set forth in claim 10 wherein said locking mechanism includes a biasing member energized between said seat cushion and said pin for continuously biasing said pin toward said locked position.

12. A seat assembly as set forth in claim 11 wherein said locking mechanism includes a lever pivotally coupled to said seat cushion and adapted for moving said pin between said locked and unlocked positions in response to corresponding pivotal movement of said lever relative to said seat cushion.

13. A seat assembly as set forth in claim 12 wherein said locking mechanism includes a cable extending between said pin and said lever for moving said pin between said locked and unlocked positions in response to corresponding pivotal movement of said lever relative to said seat cushion.

14. A seat assembly as set forth in claim 13 including a latch mechanism operatively coupled between said fixed and mobile members for selectively locking said mobile member relative to said fixed member in any one of said plurality of vertical positions.

15. A seat assembly as set forth in claim 14 wherein said latch mechanism includes a rack of teeth extending outwardly from said mobile member with respect to said sliding movement of said mobile member relative to said fixed member, wherein said rack of teeth defines said plurality of vertical positions.

16. A seat assembly as set forth in claim 15 wherein said latch mechanism includes a pawl movably supported by said fixed member for movement between a locked position lockingly engaged with said rack of teeth for maintaining said mobile member in one of said plurality of vertical positions and an unlocked position disengaged from said rack of teeth for allowing sliding movement of said mobile member relative to said fixed member among said plurality of vertical positions.

17. A seat assembly as set forth in claim 16 wherein said latch mechanism includes a release handle pivotally coupled to said fixed member and adapted for actuating said pawl between said locked and unlocked positions in response to corresponding pivotal movement of said release handle relative to said fixed member.

18. A seat assembly as set forth in claim 17 wherein said arm of said mobile member includes a guide post slidably coupled to said head restraint thereon for sliding movement of said head restraint relative to said mobile member.

* * * * *